(12) United States Patent
Wong (10) Patent No.: US 11,842,612 B2
(45) Date of Patent: *Dec. 12, 2023

(54) BUFFERED VIDEO RECORDING FOR VIDEO CAMERAS

(71) Applicant: Google LLC, Mountain View, CA (US)

(72) Inventor: Calvin Kyaw Wong, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,538

(22) Filed: Aug. 9, 2022

(65) Prior Publication Data

US 2022/0385826 A1 Dec. 1, 2022

Related U.S. Application Data

(63) Continuation of application No. 17/149,569, filed on Jan. 14, 2021, now Pat. No. 11,455,873.

(51) Int. Cl.
*G08B 13/196* (2006.01)
*H04N 5/14* (2006.01)
*H04N 23/73* (2023.01)
*H04N 23/65* (2023.01)
*H04N 23/667* (2023.01)

(52) U.S. Cl.
CPC . *G08B 13/19669* (2013.01); *G08B 13/19602* (2013.01); *H04N 5/144* (2013.01); *H04N 23/651* (2023.01); *H04N 23/667* (2023.01); *H04N 23/73* (2023.01)

(58) Field of Classification Search
CPC ........ G08B 13/19669; G08B 13/19602; G08B 13/18; G08B 13/189; G08B 13/19665; G08B 13/19676; G08B 13/19695; G08B 13/19697; H04N 5/232411; H04N 5/23245; H04N 5/2353
See application file for complete search history.

(56) References Cited

U.S. PATENT DOCUMENTS 9,778,937 B1   10/2017  Sivertsen
9,930,300 B2 *  3/2018  Modestine .............. H04L 67/12
10,325,625 B2 *  6/2019  Jeong ............... G08B 13/19695
(Continued)

OTHER PUBLICATIONS

"Non-Final Office Action", U.S. Appl. No. 17/149,569, dated Dec. 10, 2021, 11 pages.
(Continued)

*Primary Examiner* — Boubacar Abdou Tchoussou
(74) *Attorney, Agent, or Firm* — Colby Nipper PLLC (57) ABSTRACT

A battery-powered camera includes a system processor configured to operate in a standby mode or a full-power mode. While operating the system processor in the standby mode, the camera detects an event in a field of view of the camera; records, using an image sensor of the camera, a plurality of image frames corresponding to the field of view in which the event was detected; stores in a frame buffer the plurality of image frames; and wakes the system processor from the standby mode. While operating the system processor in the full-power mode, the camera processes the plurality of image frames stored in the frame buffer using the system processor; and provides the processed image frames for streaming.

20 Claims, 4 Drawing Sheets

(56) References Cited

U.S. PATENT DOCUMENTS

| | | | |
|---|---|---|---|
| 10,499,019 | B2 | 12/2019 | Chao et al. |
| 10,574,890 | B2 * | 2/2020 | Moloney ............ H04N 5/23218 |
| 10,757,371 | B2 | 8/2020 | Smith et al. |
| 10,929,650 | B2 | 2/2021 | Vaidya et al. |
| 10,930,126 | B1 | 2/2021 | Jeong et al. |
| 10,999,503 | B2 | 5/2021 | Siminoff |
| 11,069,217 | B2 * | 7/2021 | Wegelin ............... G08B 21/245 |
| 11,455,873 | B2 | 9/2022 | Wong |
| 2004/0212677 | A1 | 10/2004 | Uebbing |
| 2004/0212678 | A1 | 10/2004 | Cooper et al. |
| 2012/0262592 | A1 | 10/2012 | Rabii |
| 2014/0098286 | A1 | 4/2014 | Kannermark et al. |
| 2015/0206415 | A1 * | 7/2015 | Wegelin ............... G08B 21/245 340/573.4 |
| 2016/0105644 | A1 | 4/2016 | Smith et al. |
| 2018/0131844 | A1 * | 5/2018 | Lau .................... H04N 21/4302 |
| 2018/0268673 | A1 | 9/2018 | Amir |
| 2019/0020827 | A1 | 1/2019 | Siminoff |
| 2019/0141298 | A1 | 5/2019 | Vaidya et al. |
| 2019/0199976 | A1 | 6/2019 | Chao et al. |
| 2019/0340904 | A1 | 11/2019 | Yuan et al. |
| 2020/0394883 | A1 | 12/2020 | Halstead et al. |
| 2022/0223017 | A1 | 7/2022 | Wong |

OTHER PUBLICATIONS

"Notice of Allowance", U.S. Appl. No. 17/149,569, dated May 10, 2022, 8 pages.

\* cited by examiner

*if $t_0+t_1$ < frame capture time, no missing frames after the event

BUFFERED VIDEO RECORDING FOR VIDEO CAMERAS

RELATED APPLICATION(S)

This application is a continuation of and claims priority to U.S. patent application Ser. No. 17/149,569, filed on Jan. 14, 2021, the disclosure of which is incorporated by reference herein in its entirety.

TECHNICAL FIELD

This relates generally to event-based video recording at a camera device, including but not limited to buffering video data while various processing components of a camera device power on after an event detection.

BACKGROUND

Video surveillance systems that use battery-powered cameras are subject to trade-offs in power consumption versus functionality. A system that provides a continuous stream of video data may require a level of power consumption that prohibits the use of battery-powered devices. Such systems may be referred to as continuous video recording (CVR) systems. On the other hand, a system that limits the recording of video data to video clips associated with detections of particular events (e.g., motion or audio events) may require less power and is better suited to battery-powered implementations. Such systems may be referred to as event-based recording (EBR) systems.

EBR systems may save power by keeping high-power recording and/or processing components in low-power state until an event is detected. Upon detection of an event, however, recording and/or processing delays may result from the amount of time it takes these components to be powered up. As a result, important activity (e.g., the activity that caused the system to detect the event) may be missing from the video clip associated with the event.

SUMMARY

This disclosure describes a buffered video recording (BVR) system that uses a fast-boot image sensor with on-chip motion detection to quickly capture and buffer video data while a system processor is in the process of transitioning out of a standby mode. When the system processor has powered on and image processing software has initialized, the buffered video data is transferred for processing and streaming. As a result of quicker video capture and pre-processor buffering, a battery-powered camera implementing a BVR system may remain in a low-power state between event detections while providing video clips associated with detected events that are less likely to miss important activity.

In one aspect, some implementations include a battery-powered camera device and/or a method performed at a battery-powered camera device. The battery-powered has a system processor that is configured to operate in a standby mode or a full-power mode. Prior to operating the system processor in the full-power mode, the camera device (i) detects motion in a field of view of the camera; (ii) records, using the image sensor, a plurality of image frames corresponding to the field of view in which the motion was detected; (iii) buffers the plurality of image frames; and (iv) transitions the system processor from the standby mode to the full-power mode. Subsequent to transitioning the system processor to the full-power mode, the camera device uses the system processor to process the buffered plurality of image frames, and provides the processed image frames for streaming.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Figure 1A:
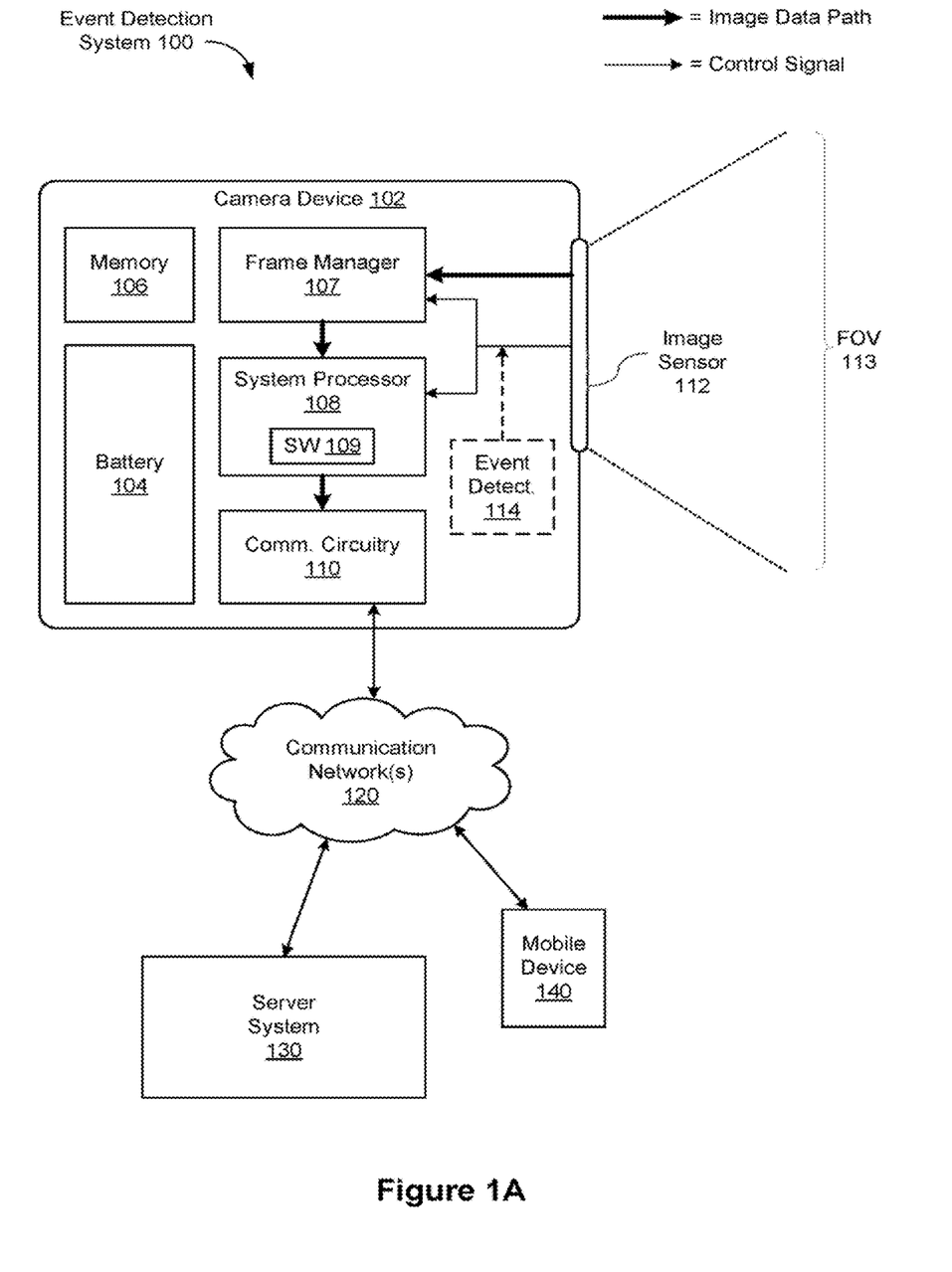
FIGS. 1A-1B are block diagrams of an event detection system implementing a BVR technique in accordance with some implementations.
Figure 1B:
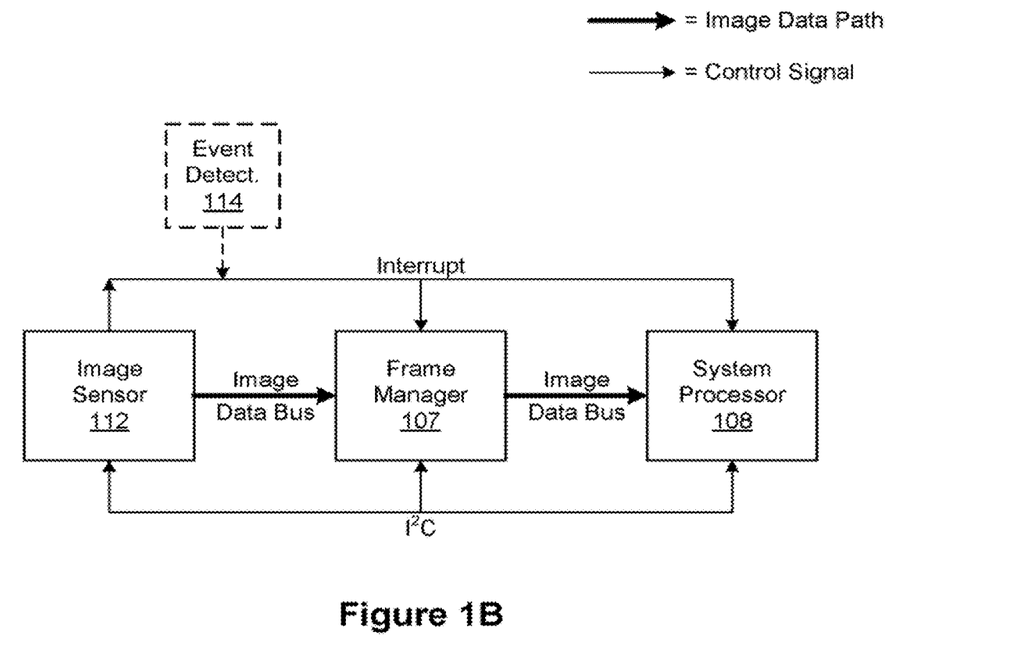

FIGS. 1A-1B are block diagrams of an event detection system 100 in accordance with some implementations. Referring to FIG. 1A, the event detection system 100 includes a camera device 102, communication network(s) 120, a server system 130, and/or a mobile device 140. In other implementations, there may be a plurality of server systems 130, no server system 130, a plurality of mobile devices 140, no mobile device 140, and/or no communication network(s) 120. For example, the camera device 102 may wirelessly stream video data to a server system 130 for storage or additional processing, and a user may access the video data using a mobile device 140 in communication with the server system 130. Alternatively, the camera device 102 may wirelessly stream video data to a mobile device 140. Alternatively, the camera device 102 may store video data locally without streaming it, making the video data available for retrieval at the camera device itself Regardless of the implementation, the event detection system 100 includes at least an image sensor 112 having a field of view (FOV) 113 extending from the camera device 102, a frame manager 107, a system processor 108 configured to run image processing software (SW) 109, communication circuitry 110, memory 106, and a power source, such as a battery 104. In some implementations, the camera device 102 includes, or is locally networked with, event detection circuitry 114 (e.g., a motion sensor and/or an audio sensor).

To maximize battery life, one or more of the aforementioned components of the camera device 102 may operate in a low-power mode or state (also referred to as standby, sleep, power-saving, or disabled). Specifically, a component operating in a low-power mode may require an amount of power such that the component can function for a period of time (e.g., at least a day, a week, a month, or longer) on power provided by the battery 104 without depleting the battery's power reserve to a level that compromises other functions of the camera device 102 that also rely on power provided by the battery 104. As a non-limiting example, some low-power motion sensors (e.g., passive infrared (PIR) sensors) may draw only several milliwatts of power (e.g., up to 10 milliwatts).

In contrast, a component may operate in a high-power mode or state (also referred to as full power, wake, or enabled). Specifically, a component operating in a high-power mode may require an amount of power such that the component's power requirements would deplete the battery 104's power reserve in a relatively short amount of time (e.g., less than an hour, less than a day, or less than a week). As a non-limiting example, pixel-based image processing using an image sensor may draw multiple watts of power (e.g., 5 watts). Such a power draw could deplete the battery in a battery-powered camera within hours.

While some components of the camera device 102 may be designed or otherwise configured to operate only in a low-power mode (e.g., a motion sensor included in event detection circuitry 114), other components of the camera device 102 may be designed or otherwise configured to switch between low-power and high-power modes (e.g., the image sensor 112 and/or the system processor 108). In the latter case, such a component could remain in a low-power mode while the component (or a function provided by the component) is either not being used or does not require full power. Such a component could transition to a high-power mode when the component (or a function provided by the component) is required to execute a function of the camera device 102 requiring full power. Such a component may take a nonzero amount of time to transition from the low-power mode to the high-power mode. This amount of time may be referred to herein as a delay or a latency (e.g., a transition delay, a wake delay, or a processing delay).

The system processor 108 includes one or more processors or processing cores for executing programs stored in the memory 106. In some implementations, the system processor 108 is a system on a chip (SoC), which integrates a plurality of processing functions of the camera device 102 (e.g., including image processing, object detection and recognition, communications, system diagnostics, power regulation, day/night mode adjustments, and so forth). The system processor 108 may comprise an image processor, with other processing functions being handled by other processing components of the camera device 102. In some implementations, the system processor 108 may function in a high-power mode or a low-power mode. Specifically, when high-power functions are not required or not being used, the system processor 108 may be disabled or kept in a low-power standby state until such high-power functions are needed.

The memory 106 stores programs that, when executed by elements of the system processor 108, perform one or more of the functions described below. In some implementations, the memory 106 may be partially or completely implemented or otherwise included in the system processor 108. The memory 106 may include high-speed random access memory, such as DRAM, SRAM, DDR RAM, or other random access solid state memory devices. The memory 106 may include non-volatile memory, such as one or more magnetic disk storage devices, one or more optical disk storage devices, one or more flash memory devices, or one or more other non-volatile solid state storage devices. The memory 106 may include one or more storage devices remotely located from one or more processing units of the system processor 108.

The image processing software 109 (alternatively referred to as an image processing module) may be configured to execute image processing functions on image data recorded by the image sensor 112. Example image processing functions include white balance adjustments, object detection and/or recognition, facial detection and/or recognition, image-based day/night mode adjustment determinations, and event notification threshold determinations (e.g., determining whether an event of interest recorded in the field of view 113 satisfies one or more thresholds required for causing the camera device 102 to (i) continue recording the event and/or (ii) transmit a notification and/or video data using the communication circuitry 110 to a user). Specifically, if the image processing software 109 detects and/or recognizes a person or object of interest in the field of view 113, the camera device 102 may continue to record video data captured by the image sensor 112, store the video data as an event (a video clip associated with an event), and/or upload the video data to a server system 130 or a mobile device 140 as an event. The recording of video data based on motion detection, person recognition, and/or object recognition is referred to herein as event-based recording. In some implementations, the system processor 108 must be in a full-power state and the image processing software 109 must be initialized in order to execute one or more of the aforementioned image processing functions. In some implementations, the image processing software 109 uses one or more machine learning algorithms to perform one or more of the aforementioned image processing functions.

The image sensor 112 may be configured to operate in one of a low-power motion detection mode and a high-power image capture mode (also referred to as an image recording mode or an image sensing mode). To support the low-power motion detection mode, the image sensor 112 may be implemented with on-chip motion detection functionality, which enables the image sensor 112 to detect motion in the field of view 113 using low-resolution images captured by the image sensor 112. Low resolution, as disclosed herein, may comprise any resolution that is less than a full-resolution capability of the image sensor 112, as long as the image sensor 112 can operate in a low-power mode while capturing such images. While in the low-power (low resolution) motion detection mode, the image sensor 112 may be configured to transition to the high-power (full resolution) image capture mode upon detection of motion in the field of view 113. The transition delay may be configured to last on the order of the amount of time it takes for the image sensor 112 to capture a single full-resolution image (referred to as a fast-boot function). As such, upon transitioning to the high-power (full resolution) image capture mode, the image sensor 112 may immediately (or close to immediately) begin capturing full-resolution images of the activity that was the subject of the detected motion.

The frame manager 107 is configured to store images captured by the image sensor 112 until the images can be further processed and/or analyzed by the image processing software 109 of the system processor 108. In some implementations, the frame manager 107 includes a first-in-first-out (FIFO) buffer. The frame manager 107 may be included in the memory 106, or it may be implemented as a separate component of the camera device 102 including its own data storage hardware (e.g., including a buffer). When the system processor 108 has completed transitioning to a full-power state (has fully powered on) and the image processing software 109 has initialized, the frame manager 107 may transfer the stored images to the system processor 108 for further processing (e.g., white balance processing) and/or analysis (e.g., object recognition).

The communication circuitry 110 is configured to transmit video data (e.g., images captured by the image sensor 112 and processed by the system processor 108) via the communication network(s) 120 to a server system 130 and/or a mobile device 140. This transmission process is referred to herein as streaming. In some implementations, the communication circuitry must be operating in a high-power mode in order to stream video data, and thus may be powered down when not in use or not required. The communication network(s) 120 may include any wireless wide area network (e.g., the Internet) and/or local area network (e.g., Wi-Fi).

The camera device 102 optionally includes event detection circuitry 114 including, for example, a motion sensor and/or an audio sensor. Such sensor(s) may supplement or replace the low-power motion detection mode of the image sensor 112. Further, such sensor(s) may operate in a low-power mode so as to provide event detection capabilities while high-power components of the camera device 102 are in a low-power state. For purposes of this disclosure, event detection may refer to detection of any movement or sound corresponding to any activity in proximity to the camera device 102 (regardless of whether the activity is in the field of view 113).

Referring to FIG. 1B, data from image frames captured by the image sensor 112 is conveyed along an image data bus to the frame manager 107 and to the system processor 108. The image data bus may be any data bus capable of conveying image data at a bandwidth that can support full resolution image capture by the image sensor 112 (e.g., using an image transfer protocol such as mobile image processing interface (MIPI)). When the on-chip motion detection feature of the image sensor 112 detects an event, the image sensor 112 transitions to the high-power (full resolution) image capture mode and propagates an interrupt signal (also referred to as a control signal or a wake signal) to the frame manager 107 and the system processor 108. Alternatively, when the event detection circuitry 114 (e.g., a motion sensor) detects an event, the event detection circuitry propagates the interrupt signal to the image sensor 112, the frame manager 107, and the system processor 108. Upon receiving the interrupt signal, each respective component wakes up or otherwise enables itself in order to operate in a high-power mode. In some implementations, the image sensor 112, frame manager 107, and system processor 108 may communicate using a serial communication bus (e.g., $I^2C$).

Figure 2:
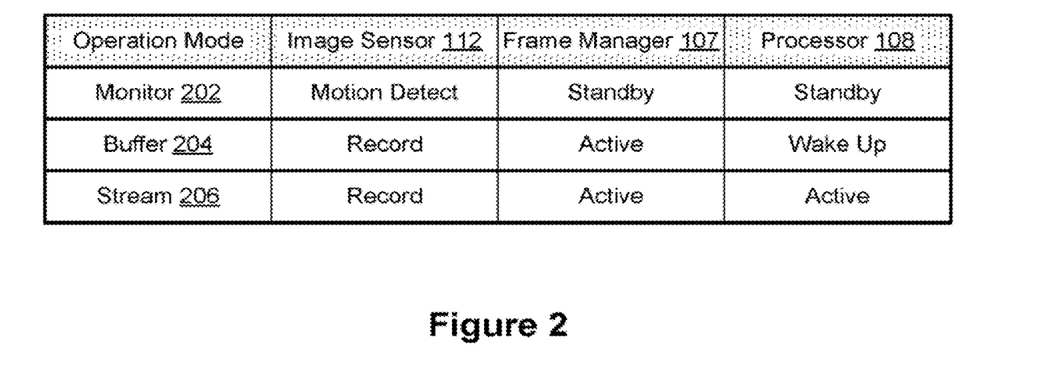
FIG. 2 is a table of BVR operation modes in accordance with some implementations.

FIG. 2 is a table of BVR operation modes in accordance with some implementations. When the camera device 102 is in a monitor operation mode 202, the image sensor 112 is in a low-power motion detection mode as described above, and the frame manager 107 and system processor 108 are each in a low-power standby mode in order to conserve battery power. Upon detection of an event (e.g., a motion event), the camera device 102 may switch to a buffer operation mode 204. In this mode, the image sensor 112 switches to a high-power image capture mode in order to record image data, the frame manager 107 switches to an active mode in order to store the image data captured by the image sensor 112, and the system processor 108 begins to wake up (transition to a high-power mode). When the system processor 108 is fully awake (functioning in the high-power mode) and image processing software 109 is fully initialized, the camera device 102 may switch to a stream operation mode 206. In this mode, the image sensor 112 continues to record image data, the frame manager 107 continues to store the recorded image data, and the system processor 108 processes the stored image data.

Figure 3:
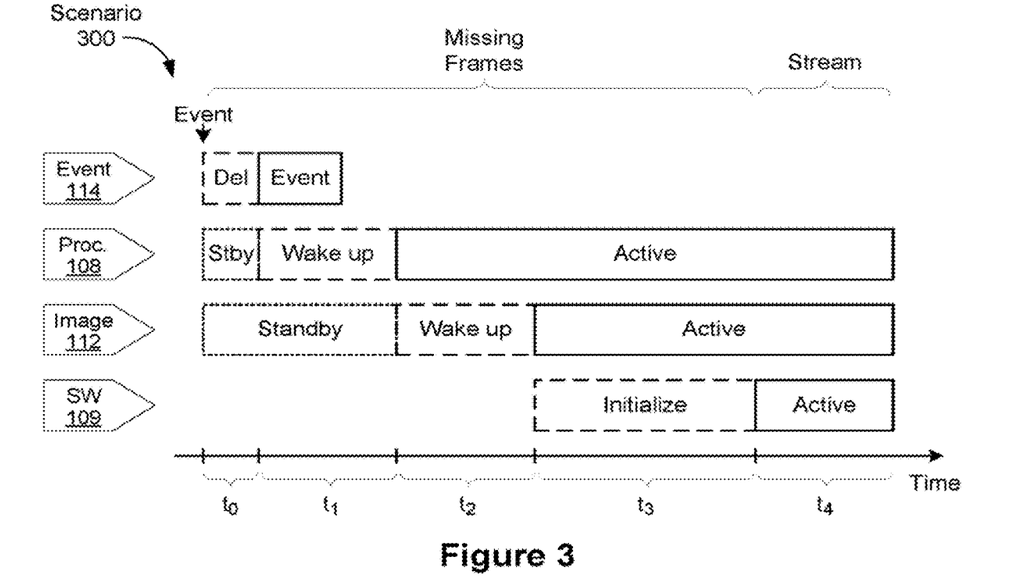
FIG. 3 is a diagram of an event detection scenario in accordance with some implementations.

FIG. 3 is a diagram of an event detection scenario 300 in accordance with some implementations. The event detection scenario 300 demonstrates the relatively high amount of missing image data that may occur without the use of the BVR techniques described herein. In the event detection scenario 300, an event (e.g., motion) occurs at the beginning of time interval $t_0$, and the event detection circuitry 114 (e.g., a PIR motion sensor) detects the event after a delay $t_0$. The length of the delay $t_0$ may depend on the capability of the event detection circuitry 114. Prior to detecting the event (e.g., prior to and during time period to), the system processor 108 and the image sensor 112 may be in a low-power standby mode. Upon detecting the event, the event detection circuitry 114 communicates the detection (e.g., by sending a control signal) to the system processor 108 at the beginning of time interval $t_1$. As a result of the event detection, the processing circuitry 108 powers up (wakes up). This transition is associated with a delay of $t_1$, during which the image sensor 112 remains powered down in a standby mode. Once the system processor 108 is powered up at the beginning of time interval $t_2$, the system processor 108 causes the image sensor 112 to power up (wake up) to a full-power image capture mode. This power-up transition is associated with a delay of $t_2$, during which the system processor 108 is active but not processing image data (image frames) since the image sensor 112 is still waking up. At the beginning of time interval 13, the image sensor 112 begins capturing image frames, but these image frames are not processed by the system processor 108 because the image processing software 109 is still initializing. The length of the image processing software 109 initialization delay 13 may depend in part on the amount of time it takes for the image processing software 109 to determine imaging parameters (e.g., exposure and white balance) to be applied at the image sensor 112 and/or to the image data captured by the image sensor 112. Upon determining the imaging parameters, the image processing software 109 causes the system processor 108 to apply the imaging parameters at the image sensor 112 and/or to the image data captured by the image sensor 112 at the beginning of time interval $t_4$, at which time the first valid frames may be recorded and provided for streaming.

During the aforementioned wake-up and initialization delays ($t_0$-$t_3$), either no image frames are being recorded, or the image frames that are being recorded are not optimized for viewing (e.g., not captured with proper exposure or white balance settings). As such, these image frames are characterized as missing frames, and they are not included in a video clip associated with the detected event. Stated another way, any activity that occurred in the field of view 113 during time intervals $t_0$-$t_3$ is not captured in a video clip corresponding to that activity.

Figure 4:
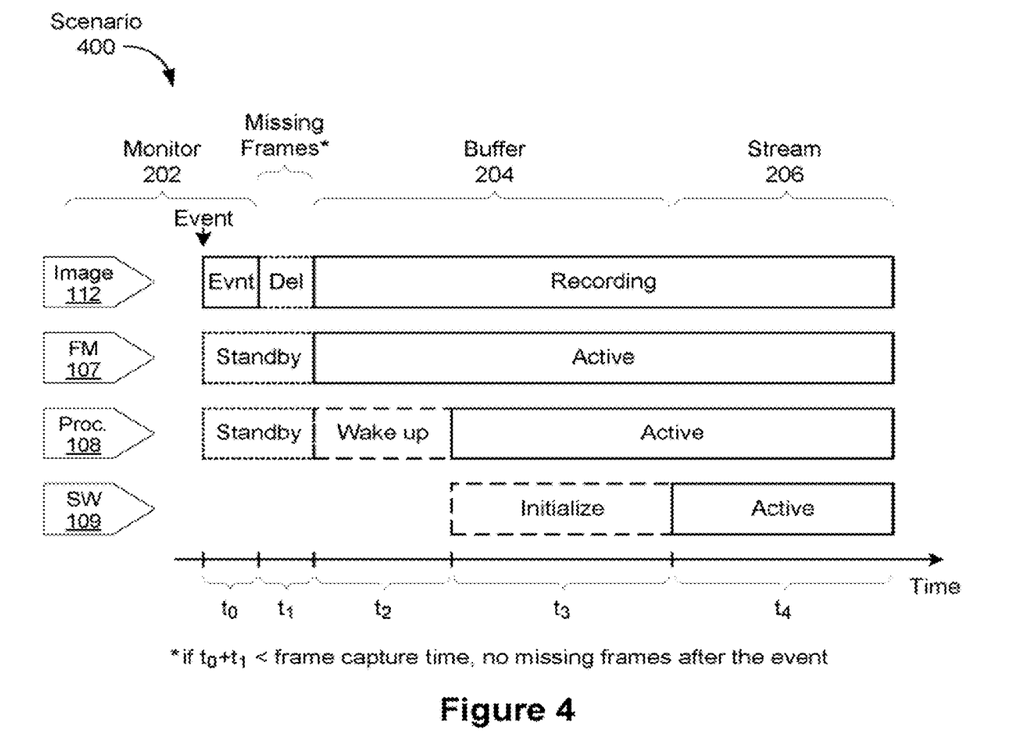
FIG. 4 is a diagram of an event detection scenario implementing a BVR technique in accordance with some implementations.

FIG. 4 is a diagram of an event detection scenario 400 using a BVR technique in accordance with some implementations. The BVR technique minimizes the amount of missing frames by storing image frames in the frame manager 107 while the system processor 108 is waking up and the image processing software 109 is initializing (during the buffer operation mode 204). The frame manager 107 transfers the image frames for processing once the system processor 108 is powered on and the image processing software 109 is initialized (during the stream operation mode 206).

Specifically, in the event detection scenario 400, an event (e.g., motion) occurs at the beginning of time interval $t_0$ (while the camera device 102 is in the monitor operation mode 202). The event may be detected by event detection circuitry 114 (not depicted) or by the image sensor 112 while in a low-power (low resolution) motion detection mode (as depicted during time interval $t_0$ in FIG. 4). Upon detecting the motion event, the image sensor 112 transitions to a high-power (full resolution) image capture mode during time interval $t_1$. During the transition delay (depicted as "Del") associated with this time interval, no image frames are captured. However, if the amount of time included in time intervals $t_0$ and $t_1$ is less than the amount of time it takes for the image sensor 112 to capture an image frame, then there will be no missing frames after detection of the event. As such, the first frames that are initially captured at the beginning of time interval $t_2$ are more likely (compared to the initial frames at 14 in scenario 300) to capture the activity in the field of view 113 that is the subject of the detected event. This initial activity (at the beginning of $t_2$) may be more relevant to the event detected at to than subsequent activity, so the ability to record image frames capturing this initial activity is significant from a user's perspective. Stated another way, the capture of the event may appear to be instantaneous from the user's perspective, since the very first frame captured at the beginning of $t_2$ includes activity that is similar to what the user would have seen without the delay $t_1$.

The image frames captured beginning at interval $t_2$ (while the camera device 102 is in the buffer operation mode 204) are transmitted to the frame manager 107, which stores them until the system processor 108 wakes up ($t_3$) and the image processing software 109 is initialized ($t_4$). Before time interval 12, the frame manager 107 and the system processor 108 may be in a low-power state. Prior to and/or during the transition delay $t_1$, the image sensor 112 may configure (or tune or establish) exposure levels so that when the image sensor 112 begins capturing image frames at the beginning of time interval $t_2$, the exposure levels may already be optimized, allowing the captured image frames to be optimized for viewing (subject to further processing) by a user.

Upon transitioning to the high-power image capture state at the beginning of time interval 12, the image sensor 112 (or associated processing circuitry) may send a control signal (an interrupt signal as depicted in FIGS. 1A and 1B) to the frame manager 107 and the system processor 108 causing each component to wake up or otherwise be enabled, as described above. Upon receiving the control signal, the frame manager 107 is enabled and receives, via an image bus (also depicted in FIGS. 1A and 1B), the image frames captured by the image sensor 112. Further, upon receiving the control signal, the system processor 108 transitions to a high-power state (wakes up). During this transition time ($t_2$), the frame manager 107 continues to buffer image frames captured by the image sensor 112. Upon waking up at the beginning of time interval $t_3$, the system processor 108 initializes image processing software 109. During this initialization time ($t_3$), the frame manager 107 continues to buffer image frames captured by the image sensor 112.

As stated above, exposure levels of the image frames captured by the image sensor 112 and buffered by the frame manager 107 during the system processor wake-up time $t_2$ and the image processing software initialization time $t_3$ may already be optimized for viewing. However, these image frames may need additional processing (e.g., white balance adjustments). As such, while the image processing software 109 is being initialized, the image processing software 109 may configure additional image settings (e.g., white balance levels), during the initialization delay $t_3$, using one or more of the image frames stored by the frame manager 107 as a reference. As a result, when the image processing software 109 is initialized at the beginning of time interval $t_4$, the system processor 108 may process the image frames stored by the frame manager 107 (e.g., by applying the adjusted white balance levels). The system processor 108 may provide the processed image frames for streaming while the camera device 102 is in the stream operation mode 206.

As a result of the buffering of image frames by the frame manager 107, latencies introduced by the power-up delay of the system processor 108 ($t_2$) and the initialization delay of the image processing software 109 ($t_3$) do not cause any delays in the capture of image frames by the image sensor 112. Further, use of a fast-boot image processor 112 in combination with the buffering of image frames by the frame manager 107 enables the near instantaneous recording of video clips triggered by detection of an event (e.g., motion), despite any power-up latencies introduced by high-power components that are in a low-power state at the time the event was detected.

Figure 5:
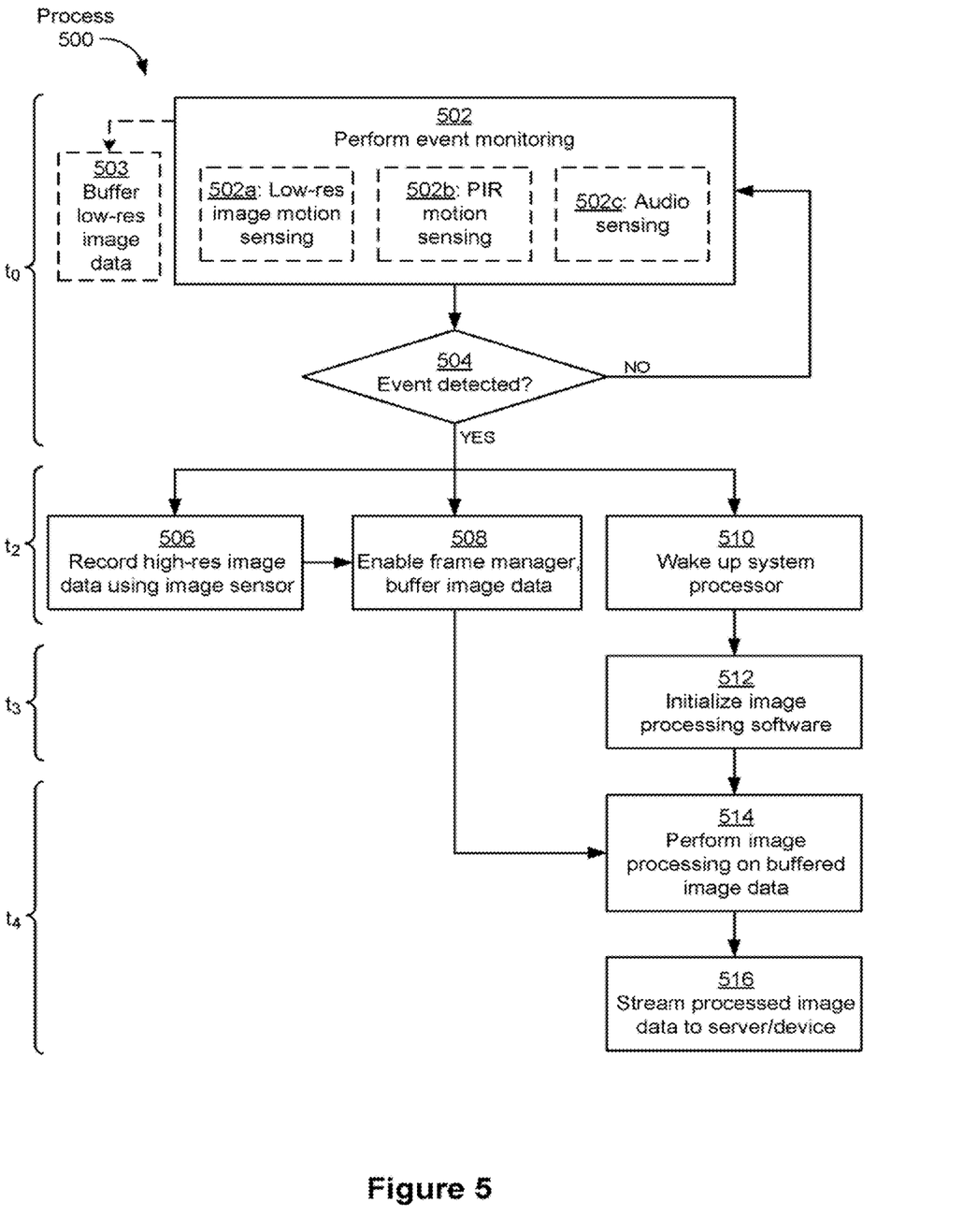
FIG. 5 is a flow diagram of an event detection process implementing a BVR technique in accordance with some implementations.

FIG. 5 is a flow diagram of an event detection process 500 using a BVR technique in accordance with some implementations. The process 500 is optionally governed by instructions that are stored in a computer memory or non-transitory computer-readable storage medium (e.g., memory 106 in FIG. 1) and that are executed by one or more processors of the camera device 102 (e.g., system processor 108). The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the process 500 may be combined and/or the order of some operations may be changed.

The camera device 102 performs (502) event monitoring using either an image sensor 112 in a low-resolution motion detection mode (502a), a low-power motion sensor (e.g., a PIR motion sensor as part of event detection circuitry 114) (502b), and/or a low-power audio sensor (e.g., a microphone as part of event detection circuitry 114) (502c), as described above with reference to the monitor operation mode 202 during time interval $t_0$.

Upon detection (504) of an event (e.g., motion), the image sensor 112 transitions to a high-power (full resolution) image capture mode (506) (or the additional circuitry 114 transmits an interrupt signal to the image sensor 112 to enable the high-power image capture mode). The image sensor 112 or the event detection circuitry 114 transmits an interrupt signal to the frame manager 107 to enable the frame manager 107 for buffering image data recorded by the image sensor 112 (508). The frame manager 107 proceeds to buffer the image data recorded by the image sensor 112. The image sensor 112 or the event detection circuitry 114 also transmits an interrupt signal to the system processor 108 to cause the system processor 108 to transition to a high-power state (wake up) (510). Operations 506, 508, and 510 may be executed in parallel or substantially in parallel (e.g., within a time period that is shorter than the frame rate of the image sensor 112) as described above with reference to the buffer operation mode 204 during time interval $t_2$.

The system processor 108 (upon waking up) initializes the image processing software 109 (512) as described above with reference to the buffer operation mode 204 during time interval $t_3$. During this time, the image processor 112 continues to capture image data and the frame manager 107 continues to buffer the captured image data.

When the image processing software 109 is initialized, the system processor 108 performs image processing using the initialized image processing software 109 on the image data buffered by the frame manager 107 (514). The system processor 108 proceeds to stream the processed image data to a server system 130 or to a mobile device 140 (516). Operations 514 and 516 may be executed as described above with reference to the stream operation mode 206 during time interval $t_4$.

Each of the operations 502-510 may be executed while the system processor 108 is in a low-power standby mode (and/or waking from the low-power standby mode), while operations 512-516 may be executed while the system processor 108 is in a full-power operational mode. Optionally, during the time interval to, the image processor 112 and frame manager 508 may be enabled to capture and store low-resolution images prior to an event being detected (503). These low-resolution images may be stored in a circular buffer having a predetermined size. For example, the frame manager 107 may be configured to store 5 seconds of video data comprising low-resolution image frames captured prior to an event detection (before time interval $t_0$). As a result, in some implementations, the last 5 seconds of video data that occurred just before an event was detected may be added to the video clip associated with that event. The low-resolution image data stored by the frame manager 107 prior to the detection of an event may be referred to as pre-roll video data. The pre-roll video data may continuously be overwritten with successively captured pre-roll video data until an event is detected. Since the pre-roll video data is captured while the image sensor 112 is in a low-power state, the pre-roll video data may subject to intermediate processing (e.g., monotone filtering) in order to optimize the video data for viewing.

In some implementations, the system processor 108 (using the image processing software 109) may determine whether to stream the processed image data in operation 516 in accordance with one or more user-configured thresholds. These thresholds may be configured in order to further extend battery life of the camera device 102. For example, a user may determine that detected events associated with a length of time or an amount of motion below a respective threshold or characterized in a particular way (e.g., not associated with a recognized person or object) should not be streamed. In such a scenario, the system processor 108 could be powered back down to a low-power standby mode, and the communication circuitry 110 could remain in a low-power standby mode, thus allowing the camera device 102 to consume less power. A user could adjust motion, time, and recognition sensitivities by setting corresponding thresholds in, for example, an application executing on the mobile device 140.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A method comprising:
   detecting, while operating a system processor of a camera device in a standby mode, an event within a sensing region of the camera device;
   causing, responsive to detecting the event, a transition of the system processor from the standby mode to a full-power mode;
   enabling, responsive to detecting the event, a frame buffer to store image frames captured by an image sensor of the camera device during the transition of the system processor;
   capturing, responsive to detecting the event, a plurality of image frames associated with at least portions of the sensing region via the image sensor of the camera device;
   storing, responsive to enabling the frame buffer, the plurality of image frames in the frame buffer during the transition of the system processor from the standby mode to the full-power mode;
   processing, while operating in the full-power mode, the plurality of image frames stored in the frame buffer via the system processor; and
   providing, responsive to the processing, the processed image frames for streaming.

2. The method of claim 1, wherein detecting the event within the sensing region of the camera device comprises detecting one or more motion events or sound events.

3. The method of claim 2, wherein the sensing region comprises an environment surrounding the camera device within which one or more sensors of the camera device are configured to detect the one or more motion events or sound events.

4. The method of claim 3,
   wherein the one or more sensors comprise the image sensor,
   wherein detecting the event comprises detecting a motion event of the one or more motion events via the image sensor while the image sensor is operating in a low-power motion detection mode, and
   wherein capturing the plurality of image frames comprises transitioning the image sensor from the low-power image detection mode to a high-power image capture mode in response to detecting the motion event.

5. The method of claim 3,
   wherein the one or more sensors comprise a passive infrared motion sensor,
   wherein detecting the event comprises detecting a motion event of the one or more motion events via the passive infrared motion sensor while the image sensor is operating in a standby mode, and
   wherein capturing the plurality of image frames comprises transitioning the image sensor from the standby mode to a high-power image capture mode in response to detecting the motion event.

6. The method of claim 3,
   wherein the one or more sensors comprise an audio sensor, wherein detecting the event comprises detecting a sound event of the one or more sound events via the audio sensor while the image sensor is operating in at least one of a standby mode or a low-power motion detection mode, and wherein capturing the plurality of image frames comprises transitioning the image sensor from the standby mode or the low-power image detection mode to a high-power image capture mode in response to detecting the sound event.

7. The method of claim 1, further comprising:

adjusting, while operating the system processor in the standby mode, an exposure setting of the image sensor while the image sensor is in a low-power motion detection mode prior to detecting the event, and wherein capturing the plurality of image frames comprises transitioning the image sensor from the low-power motion detection mode to a full-power image capture mode using the adjusted exposure setting.

8. The method of claim 1, wherein the transition of the system processor from the standby mode to the full-power mode occurs over a first time period, and wherein the plurality of image frames includes one or more image frames captured and stored during the first time period.

9. A camera device comprising:

an image sensor;

a frame buffer;

a system processor; and memory storing one or more programs to be executed by the system processor, the one or more programs including instructions for:

detecting, while operating a system processor of a camera device in a standby mode, an event within a sensing region of the camera device, the event including one or more motion events or sound events;

causing, responsive to detecting the event, a transition of the system processor from the standby mode to a full-power mode;

enabling, responsive to detecting the event, a frame buffer to store image frames captured by an image sensor of the camera device during the transition of the system processor;

capturing, responsive to detecting the event, a plurality of image frames associated with at least portions of the sensing region via the image sensor of the camera device;

storing, responsive to enabling the frame buffer, the plurality of image frames in the frame buffer during the transition of the system processor from the standby mode to the full-power mode;

processing, while operating in the full-power mode, the plurality of image frames stored in the frame buffer via the system processor; and providing, responsive to the processing, the processed image frames for streaming.

10. The camera device of claim 9, wherein the instructions further include instructions for:

detecting a motion event of the one or more motion events using the image sensor while the image sensor is operating in a low-power motion detection mode.

11. The camera device of claim 9, further comprising:

at least one of a passive infrared motion sensor or an audio sensor, and wherein the instructions for detecting the event include instructions for detecting a motion event of the one or more motion events via the passive infrared motion sensor or detecting a sound event of the one or more sound events via the audio sensor.

12. The camera device of claim 9, wherein the instructions further include instructions for:

adjusting, while operating the system processor in the standby mode, an exposure setting of the image sensor while the image sensor is in a low-power motion detection mode prior to detecting the event; and transitioning the image sensor from the low-power motion detection mode to a full-power image capture mode sufficient to enable the image sensor to capture the plurality of image frames using the adjusted exposure setting.

13. The camera device of claim 9, wherein:

the transition of the system processor from the standby mode to the full-power mode occurs over a first time period; and the capturing of the plurality of image frames and the storing of the plurality of image frames are performed during the first time period.

14. The camera device of claim 9, wherein the instructions further include instructions for:

initializing, prior to processing the plurality of image frames, image processing software during a first time period; and capturing and storing image frames during the first time period.

15. A non-transitory computer-readable storage medium storing one or more programs configured for execution by a camera device, the one or more programs including instructions for:

detecting, while operating a system processor of a camera device in a standby mode, an event within a sensing region of the camera device, the event including one or more motion events or sound events;

causing, responsive to detecting the event, a transition of the system processor from the standby mode to a full-power mode;

enabling, responsive to detecting the event, a frame buffer to store image frames captured by an image sensor of the camera device during the transition of the system processor;

capturing, responsive to detecting the event, a plurality of image frames associated with at least portions of the sensing region via the image sensor of the camera device;

storing, responsive to enabling the frame buffer, the plurality of image frames in the frame buffer during the transition of the system processor from the standby mode to the full-power mode;

processing, while operating in the full-power mode, the plurality of image frames stored in the frame buffer via the system processor; and providing, responsive to the processing, the processed image frames for streaming.

16. The non-transitory computer-readable storage medium of claim 15, wherein the instruction further include instructions for:

detecting a motion event of the one or more motion events using the image sensor while the image sensor is operating in a low-power motion detection mode; and transitioning the image sensor from the low-power motion detection mode to a full-power image capture mode in response to detecting the motion event.

17. The non-transitory computer-readable storage medium of claim 15, wherein the instructions further include instructions for:
   detecting a motion event of the one or more motion events via a passive infrared motion sensor of the camera device while the image sensor is operating in a low-power motion detection mode; and
   transitioning the image sensor from the low-power motion detection mode to a full-power image capture mode in response to detecting the motion event.

18. The non-transitory computer-readable storage medium of claim 15, wherein the instructions further include instructions for:
   detecting a sound event of the one or more sound events via an audio sensor of the camera device while the image sensor is operating in at least one of a standby mode or a low-power motion detection mode; and
   transitioning the image sensor from the standby mode or the low-power motion detection mode to a full-power image capture mode in response to detecting the sound event.

19. The non-transitory computer-readable storage medium of claim 15, wherein the instructions further include instructions for:
   adjusting, while operating the system processor in the standby mode, an exposure setting of the image sensor while the image sensor is in a low-power motion detection mode prior to detecting the event; and
   transitioning the image sensor from the low-power motion detection mode to a full-power image capture mode using the adjusted exposure setting.

20. The non-transitory computer-readable storage medium of claim 15, wherein:
   the transition of the system processor occurs over a first time period; and
   the capturing and storing of the plurality of image frames are performed during the first time period.

\* \* \* \* \*